United States Patent [19]

Kawashima

[11] Patent Number: 4,765,680
[45] Date of Patent: Aug. 23, 1988

[54] SEAT RECLINING DEVICE

[75] Inventor: Hatsuo Kawashima, Shizuoka, Japan

[73] Assignee: Fuji Kiko Kabushiki Kaisha, Tokyo, Japan

[21] Appl. No.: 10,167

[22] PCT Filed: Apr. 12, 1986

[86] PCT No.: PCT/JP86/00182

§ 371 Date: Feb. 12, 1987

§ 102(e) Date: Feb. 12, 1987

[87] PCT Pub. No.: WO86/05958

PCT Pub. Date: Oct. 23, 1986

[30] Foreign Application Priority Data

Apr. 12, 1985 [JP] Japan .................. 60-78818
Apr. 12, 1985 [JP] Japan .................. 60-129250

[51] Int. Cl.$^4$ .......................... A47C 1/025; B60N 1/06
[52] U.S. Cl. ........................................ 297/367; 74/530; 297/365
[58] Field of Search ................... 297/366–369, 297/379; 74/530, 577 M

[56] References Cited

U.S. PATENT DOCUMENTS 3,901,100 8/1975 Iida et al. .................. 297/379 X
4,337,978 7/1982 Kazaoka et al. .............. 297/367
4,348,050 9/1982 Lebournoux et al. .......... 297/367 X

FOREIGN PATENT DOCUMENTS 2845281 4/1980 Fed. Rep. of Germany ...... 297/366
56-130110 10/1981 Japan .
59-196125 12/1984 Japan .

Primary Examiner—Kenneth J. Dorner
Assistant Examiner—Peter R. Brown
Attorney, Agent, or Firm—Helfgott & Karas

[57] ABSTRACT

A seat reclining device comprises a base plate which is fixed to the seat cushion side; an arm plate which is rotatably attached to the said base plate and is also fixed to the seat back side; a pair of upper plates, each having meshing teeth which extend over a certain area, which are fixed to the arm plate through the same shaft; a pair of lower pawls, each having meshing teeth which can engage to the meshing teeth on the upper plates without interfering with each other, and which are supported on the base plate and coaxially provided; a cam plate which is associated with said lower pawl placed in engagement and can rotate so as to hold the pawl in control or to release it. A release control section is coupled to the said cam plate to control its action so as to either hold the said cam plate in control or release it; such that the pitches of the respective meshing teeth of the said upper plates are mutually displaced by ½ tooth.

2 Claims, 8 Drawing Sheets

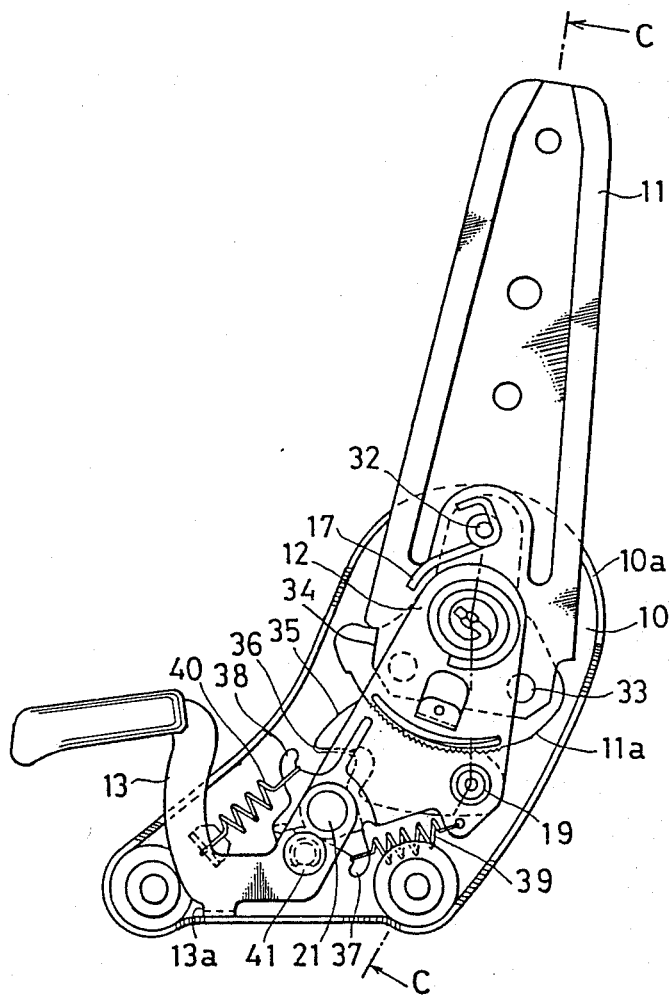
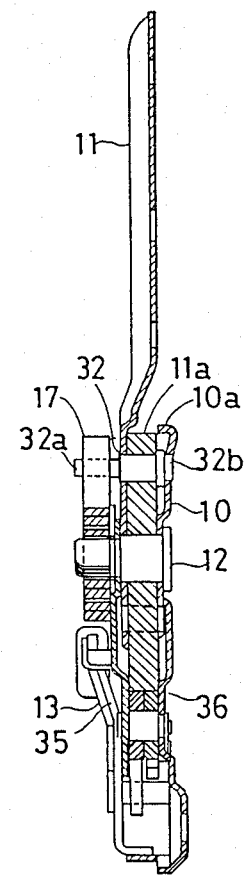
FIG.7                    FIG.8

SEAT RECLINING DEVICE

TECHNOLOGICAL FIELD

This invention relates to a seat reclining device which puts an automobile seat in the optimum positions.

BACKGROUND TECHNOLOGY

Conventional seat reclining devices for inclining a seat back at the desired angle include, for example, the one disclosed in Utility Model Publication of Unexamined Application No. SHO-59-41153. As shown in FIG. 5, this device includes a base plate 101 which is attached to the seat cusion A, an arm 103 which is fixed to the seat back B which is rotatably attached on the outside of this base plate 101, an upper tooth 105 which is attached to this arm 103, a lower tooth 107 which meshes with this upper tooth 105 and holds the arm 103 at the desired angle of rotation, and release control section 109 which can engage and disengage this lower tooth 107 to and from the said upper tooth 105. The arm 103 is gripped between the base plate 101 and a holder plate 111 and is attached to the base plate 101 through an arm shaft 113. On the other side of the holder plate 111, the release control section 109 is attached to the arm shaft 113 through an E-ring 115. Then, on the outside of that, a return spring 119 is attached respectively to the base plate 101 along the same axis to the arm 103 through a washer 117. Further, the upper tooth 105 is normally meshed with the lower tooth 107. This lower tooth 107 is attached between the base plate 101 and the holder plate 111 by a pin 121. A cam 125 is coupled to a depression 123 in the lower tooth 107. This cam 125 is attached between the base plate 101 and the holder plate 111 through a shaft 127. On the outside of the holder plate 111, a rod lever 129 is fixed and coupled to the shaft 127. A pin rod 131 is formed in the other end of the rod lever 129. The pin rod 131 is inserted into the long hole 133 in the lever control section 109, and thus the rod lever 129 is also coupled to the section 109. It is axially fixed in place by a nut 135 which prevents it from pulling out.

In such a seat reclining device, in order to adjust the seat back B to the desired angle, the lower tooth 107 and the upper tooth 105 are disengaged through the cam 125 which is controlled by the release control section 109. Next, after the seat back B has been rotated to the desired angle, it is held in a desired inclination attitude by engaging the upper tooth 105 with the lower tooth 107.

The tooth sections a and b of the upper tooth 105 and the lower tooth 107 must be strong enough to withstand the forces applied to the seat back B during, for example, a vehicle collision. For this purpose, the toothed sections a and b of the upper tooth 105 and the lower tooth 107 are finished to high accuracy with specified standard pitch.

The final adjustment to the angle at which the seat back will be held is determined by the pitch of the tooth section a formed in the upper tooth 105. If it is desired to have a finer adjustment, so that the rotating angle is made smaller, the pitch of the tooth section a must be smaller. If the pitch of the toothed section a is made smaller than the standard pitch, the strength can be adversely affected.

The purpose of this invention is to provide a seat reclining device in which secure meshing is possible and fine adjustment of the seat back angle is possible while maintaining the same strength as in the conventional device.

Another existing type of seat reclining device is disclosed by Japanese Utility Model Application No. SHO-59-10186. This will be explained with reference to FIG. 10. The seat reclining device R comprises a base plate 10 which is fixed to the seat cushion A, an arm 11 is fixed to the seat back B which is pivotally attached on the outside of this base plate 10, an upper tooth 11a which is formed in this arm 11, a lower tooth 18 which meshes with this upper tooth 11a and holds the arm 11 at the desired angle of rotation, and a release lever 13 which can be engaged this lower tooth 18 to and disengaged from the said upper tooth 11a. The said arm 11 is gripped between the base plate 10 and a holder plate 14, and is attached to the base plate 10 through an arm shaft 12. On the outside of the said holder plate 14, a release lever 13 is attached to the said arm shaft 12 through the E-ring 15. To the outside of it, in turn, a return spring 17 is attached to the base plate 12 along the same axis as the arm 11 through a washer 16. In addition, the upper tooth 11a which is solidly attached to the arm 11 is normally engaged to the lower tooth 18. This lower tooth 18 is attached between the base plate 10 and the holder plate 14. A cam 20 is engaged to a depression 18b in the lower tooth 18. This cam 20 is attached between the base plate 10 and the holder plate 14 through the shaft 21. In addition, a rod lever 22 is fixed and coupled to the shaft 21 on the outside of the holder plate 14. A pin rod 22a is formed in the other end of this rod lever 22. The pin rod 22a is inserted into the long hole 13a in the lever 13, and the rod lever 22 is thus coupled to the lever 13. It is fixed in place by a push nut 23 which prevents it from pulling out.

In a seat reclining device with the above configuration, in order to keep the lower tooth and the upper tooth securely engaged and provide the strength needed to withstand, for example, a vehicle collision, the toothed sections of the upper tooth and lower tooth are finished to high precision by a process such as broaching with an appropriate standard pitch. In such meshing of an upper tooth with a lower tooth, in order to provide finer adjustment of the seat back reclining angle, the pitch of the toothed sections of the upper tooth and the lower tooth must be made smaller, but in this case there are limits from the points of view of both strength and precision. In addition, in this kind of seat reclining device, the release lever and the lower tooth are coupled through a rod lever and a cam, so that when the seat back is pushed down in the forward direction, the release lever is pulled up from its usual position and there is a danger that the seat belt mounted to the seat position will get caught between the release lever and the seat cushion. If the seat belt is buckled up around a rider while it is caught between the release lever and the seat cushion, there is a danger that while the car is moving the release lever will pop up and the seat back will fall forward, which is dangerous.

This invention focuses on problems such as those described above. Its purpose is to provide a seat reclining device in which the upper tooth and the lower tooth are kept securely engaged, the strength is adequate, and in addition the seat reclining angle can be more finely adjusted than has been the case previously.

DISCLOSURE OF THE INVENTION

In order to achieve the purposes stated above, in this invention a seat reclining device comprises a base plate which is fixed to the seat cushion side, an arm plate which is rotatably attached to the base plate and is also fixed to the seat back side, a pair of upper plates which are fixed to the arm plate have gear teeth which extend over a certain area and are fixed to the same shaft, a pair of lower pawls which are supported on the base plate have teeth which can mesh without interfering with the meshed gear teeth of the upper plates and are pivotally attached to the same shaft, a cam plate which is supported by the base plate side, engages with the lower pawls when they are meshed and can rotate between one position where the teeth are engaged and another position where they are released from constraint, and a release control section which is coupled to the cam plate and controls its movement between the hold and release positions, wherein the pitches of the meshing teeth of the said upper plates are mutually displaced by ½ tooth.

In another seat reclining device which comprises a base place which is fixed to the seat cushion, an arm plate which is pivotally attached to this base plate and in addition is fixed to the seat back, an upper plate which is fixed to the lower side of this arm plate, a lower pawl which is engaged to this upper pawl and hold the seat back at the desired reclining angle, a cam which is coupled to this lower pawl, a release lever which can engage and disengage the said lower pawl to and from the said upper plate through the said cam, and a holder plate which together with the base plate grips the arm plate, the lower pawl and the said cam, wherein the said lower pawl comprises a pair of tooth plates which have a plurality of teeth of the same pitch and have their pitches mutually displaced by ½ tooth.

BRIEF DESCRIPTION OF THE DRAWINGS

FIG. 7 is an explanatory diagram of the same embodiment seem from the side.

FIG. 8 shows a cross-section of the same embodiment along line C—C.

DESCRIPTION OF THE PREFERRED EMBODIMENT

One embodiment of this invention will be explained in detail below referring to FIGS. 1 through 4.

Figure 1:
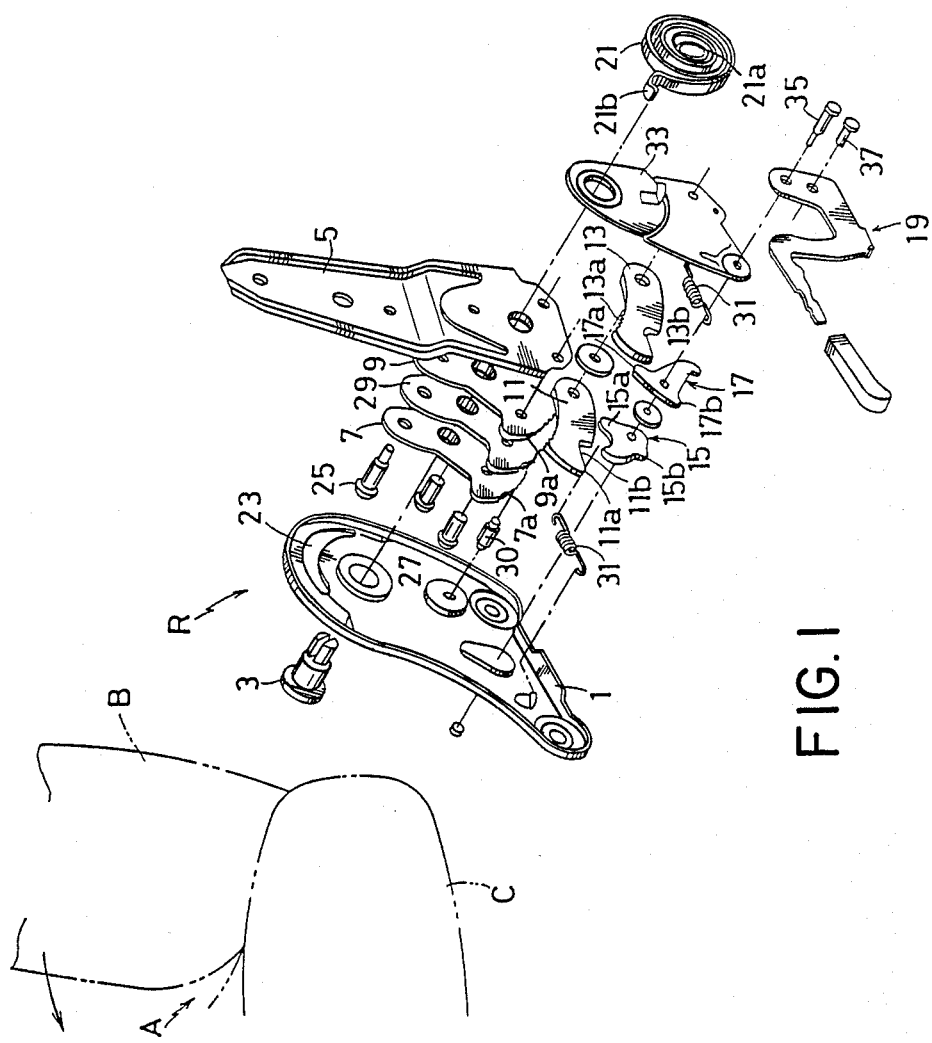
FIG. 1 shows an exploded diagonal view of the seat reclining device of this invention.

FIG. 1 shows the seat reclining device R of this invention. The device R comprises a base plate 1, an arm plate 5 which is pivotally attached on the outside of this base plate 1 through the shaft 3, a pair of upper plates 7 and 9, which have meshing gear sections 7a and 9a, at the lower end of this arm plate 5, a pair of lower pawl 11 and 13 having meshing tooth sections 11a and 13a which can freely engage to and disengage from the meshing tooth sections 7a and 9a of the upper plates and 9, a pair of cam plates 15 and 17 which engage to the lower teeth 11 and 13, and a release control section 19 which acts through the said cam plates 15 and 17 to cause the lower pawl 11 and 13 to engage to and disengage from the upper teeth 7 and 9.

The arm plate 5 is attached to the seat back B of the seat A, and the base plate 1 is attached to the seat cushion C. The seat back B is normally kept in the forward position (shown by the arrow in FIG. 1) by the return spring 21. The return spring 21 is formed in a spiral shape. Its center tip section 21a is attached to the shaft 3, and the outer tip section 21b is attached to the arm plate 5.

A long circular arc-shaped hole 23 is formed in the upper part of the base plate 1. The fixed pin 25 to be discussed below is next to the long hole 23. The fixed pin 25 slides between the two ends of the long hole 23, functioning as a stopper to limit the range of rotation of the seat back B.

Meanwhile, the pair of upper plates 7 and 9 are fixed on the outside of the fixed pin 25 (on the right side of FIG. 1), at the lower part of the arm plate 5, on opposite sides of a separator 29. This holds the upper plates 7 and 9 separated by a fixed distance. This prevents interference when the lower pawl 11 and 13 are engaged. The upper plate 7 has meshing teeth 7a having a pitch P extending across a certain area of its lower edge. The meshing teeth 9a of the other upper plate 9, which is installed parallel to this upper plate 7, have a standard pitch $P_1$ and extend over a certain area, in these respects they are similar to the meshing teeth 7a of the upper plate 7. However, there is a ½ tooth displacement between the pitches of the meshing teeth 7a and 9a.

The meshing tooth sections 7a and 9a of the upper plates 7 and 9 are made to have a ½ tooth displacement or phase difference between their pitches. It is also possible to form the upper plates 7 and 9 with the same pitches and attach the upper plates 7 and 9 to the arm plate 5 with separate fixed pins 25 and 27 in such a way as to obtain the same ½-tooth displacement.

The lower pawls 11 and 13 have mating depressions 11b and 13b and are attached to the base plate 1 by the tooth pin 30. The mating depressions 11b and 13b of the lower pawls 11 and 13 are press-fitted onto the protrusions 15a and 17a of the cam plates 15 and 17 so that the meshing tooth sections 11a and 13a of the lower pawls 11 and 13 willmesh with the meshing tooth sections 7a and 9a of the upper plates 7 and 9. The cam plates 15 and 17 are attached to the base plate 1 together with the control section 19 through the arm shaft 35 of the release control section 19 which is pivotally attached to the holder plate 33. In addition, the protrusions 15a and 17a of the cam plates 15 and 17 are energized toward the said mating depressions 11b and 13b by the energization springs 31 and 31; one end of each of the energization springs 31 and 31 is attached to the cam plates 15 and 17, respectively, while the other ends are attached to the holder plate 33 of the base plate 1.

The holder plate 33 is located on the outside of the said arm plate 5, and is fixed by the said shaft 3.

Figure 2:
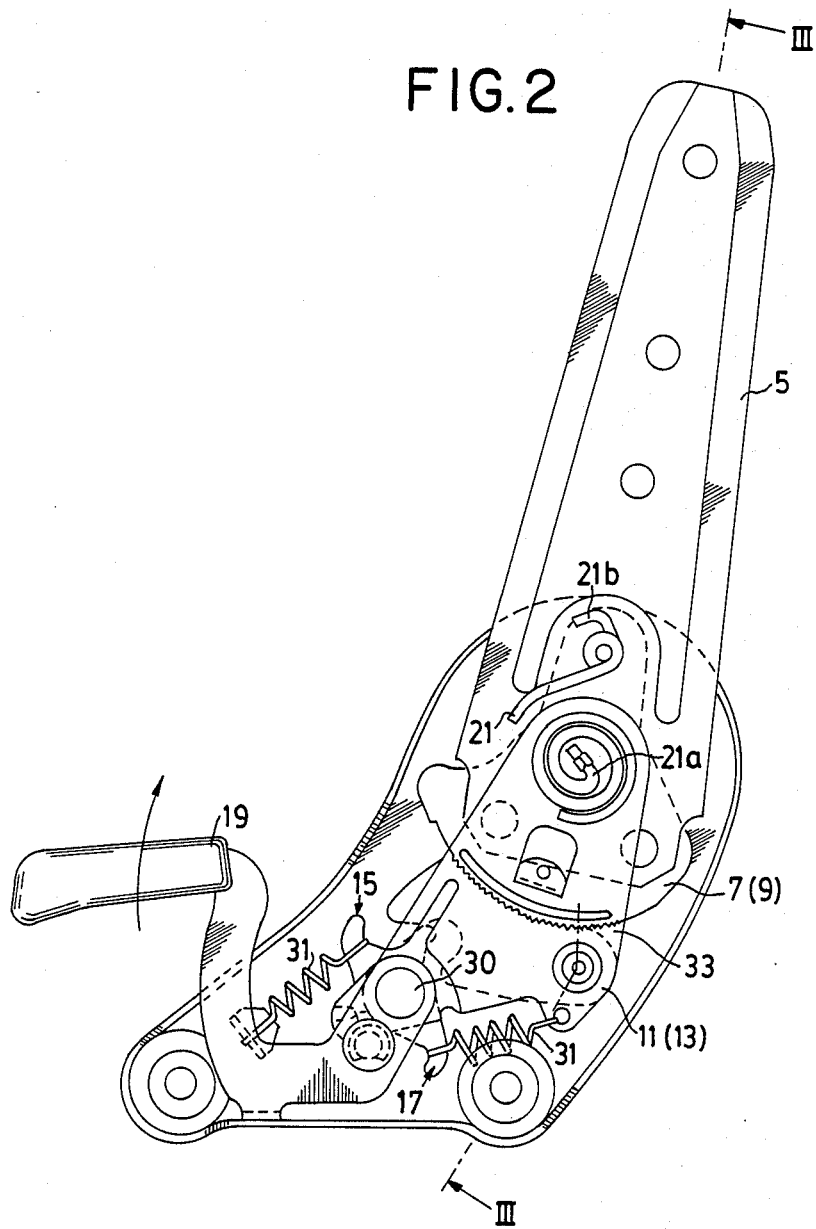
FIG. 2 shows a side view of the reclining device.
Figure 3:
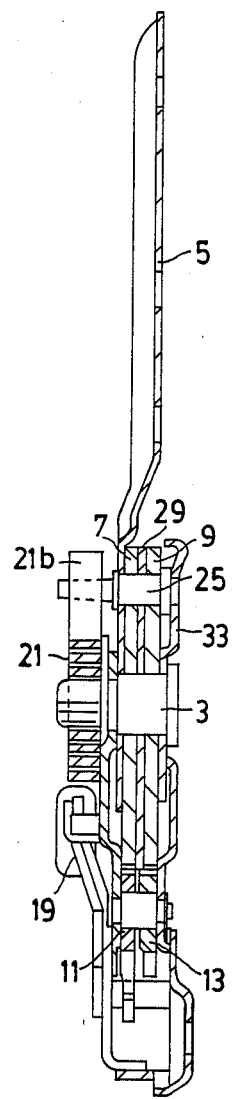
FIG. 3 shows a cross-section along line II—II in FIG. 2.
Figure 4:
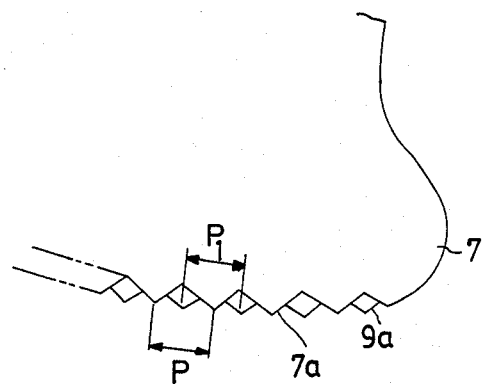
FIG. 4 shows an expanded view of the meshing teeth of the upper plate.
Figure 5:
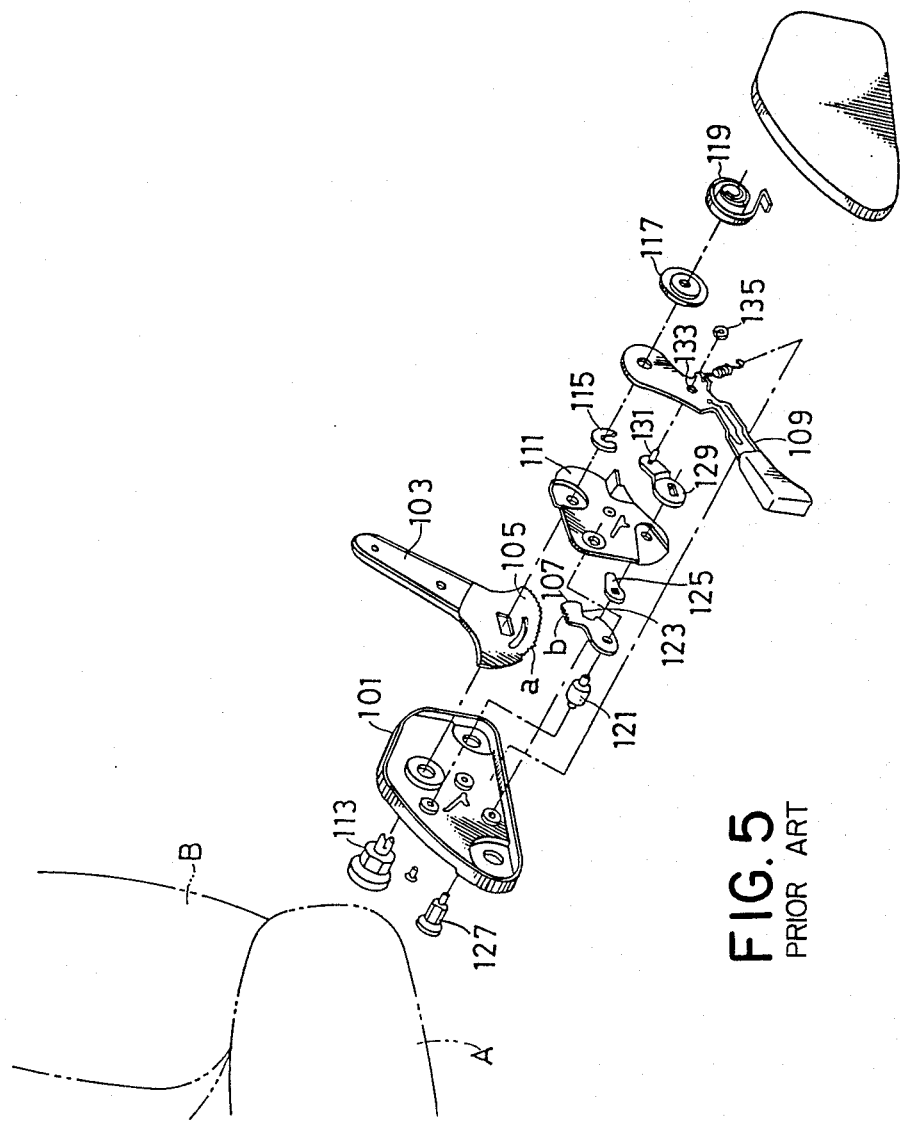
FIG. 5 shows a overall diagonal view of a previously existing prior art reclining device.

Meanwhile, the action pin 37 in the release control section 19 is located where it butts up against the protrusions 15b and 17b of the cam plates 15 and 17 when the control section 19 rotates upward (as shown by the arrow in FIG. 2). When the action pin 37 butts up against the protrusions 15b and 17b, the protrusions 15a and 17a of the cam plates 15 and 17 are pushed away from the mating depressions 11b and 13b against the energization springs 31 and 31.

In a seat reclining device having such a configuration, the seat back B is adjusted by operating the release control section 19 (arrow in FIG. 2) to disengage the meshing tooth sections 7a and 9a of the upper plates 7 and 9 from the meshing tooth sections 11a and 13a of the lower pawls 11 and 13. Next, the said seat back B is rotated and set to the desired angle. At this time, since the meshing tooth sections 7a and 9a of the upper plates 7 and 9 are displaced by ½ tooth from the meshing tooth sections 11a and 13a of the lower pawls 11 and 13, the meshing tooth sections of, for example, the upper plate 9 and the lower pawl 13 fail to mesh because the tooth contact is ridge-to-ridge. Meanwhile, the meshing tooth sections of the upper tooth 7 and the lower pawl 11 mesh with ridge-to-groove contact, so that the arm plate 5 is held in place. Consequenty, the respective meshing tooth sections 7a–11a and 9a–13a have a ½-tooth pitch so that the angle can be finely adjusted in small steps to obtain the optimum angle. Since the respective meshing tooth sections are held a fixed distance apart by the separator 29, they do not interfere; moreover, because of the standard pitch, they mesh securely. In addition, rigidity is preserved.

Thus, in this seat reclining device, the upper plate is disengaged from the lower pawl by the release control section through a cam. Next, the arm plate is rotated to the desired angle, and then the upper plate is re-engaged to the lower pawl. At this time, the upper plate meshing teeth are displaced by ½ tooth from the lower tooth meshing teeth, so one of the pairs will make ridge-to-ridge contact and fail to mesh. Meanwhile, the other pair will mesh to hold the arm plate in place. Consequently, the meshing teeth can be finely adjusted with a pitch of ½ tooth to hold the seat back at the desired angle.

As explained above, in the seat reclining device of this invention, the meshing tooth sections of the upper plate and lower pawl mesh securely to maintain the same strength as in conventional seat reclining devices. Moreover, when the final setting is made, the angle can be finely adjusted in small steps to obtain the desired seat back angle.

Figure 6:
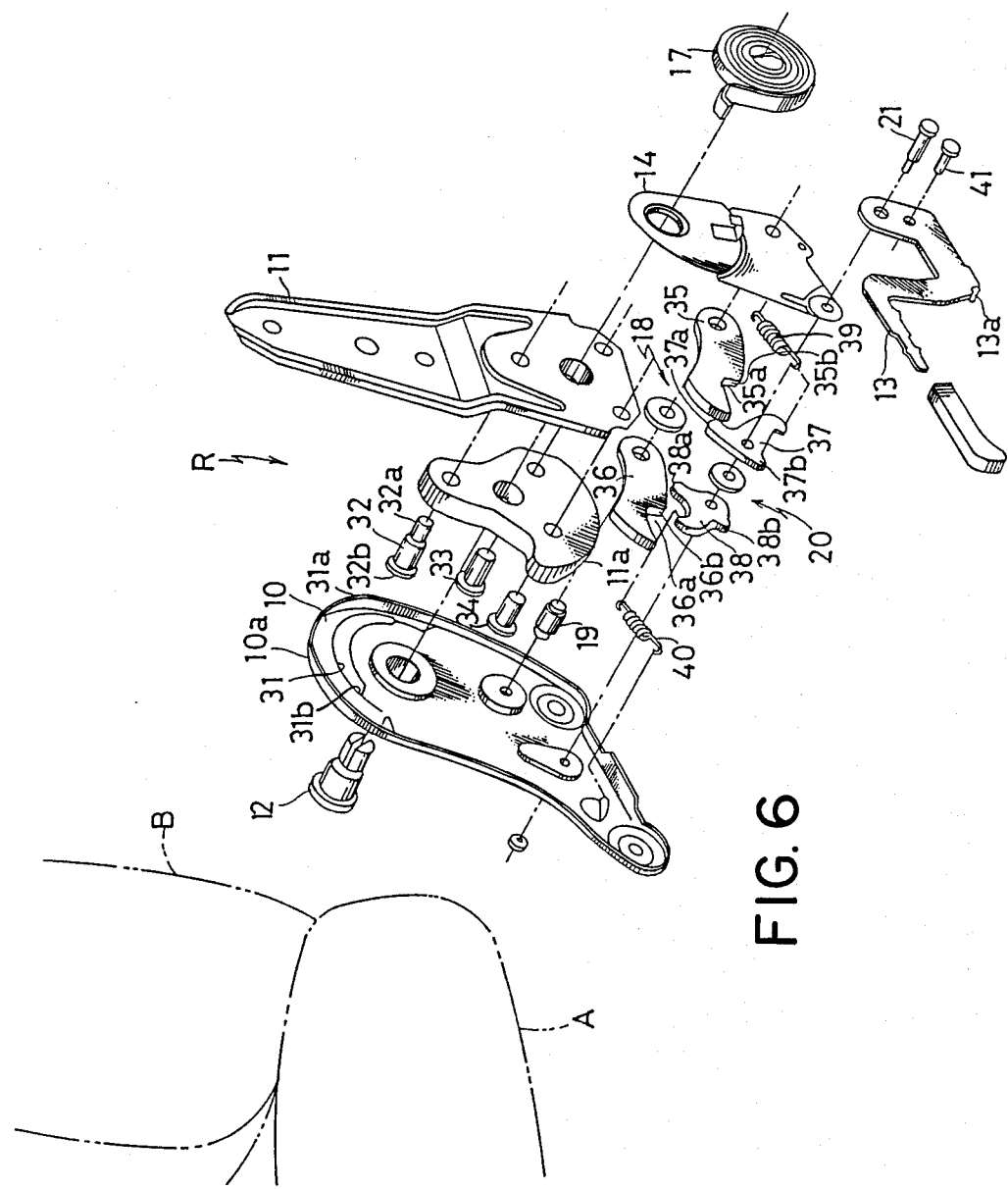
FIG. 6 shows an exploded diagonal view of an embodiment of this invention.

As shown in FIG. 6, the seat reclining device R of this embodiment comprises a base plate B which is fixed to the seat cushion A, an arm plate 11 which is pivotally attached to the shaft 12 on the outside of this base plate 10 and fixed to the seat back B, an upper plate 11a which is fixed to the lower end of this arm plate 11, a lower pawl 18 which engages to this upper plate 11a and holds the seat back B at the desired reclining angle, a cam 20 which couples to this lower pawl 18, a release lever 13 which engages and disengages the said lower plate 18 to and from the upper pawl 11a through the said cam 20, and a holder plate 14 which grips the arm plate 11, the lower pawl 18 and the cam 20 between itself and the base plate 10.

The arm plate 11 is gripped between the base plate 10 and the holder plate 14, and is attached to the base plate 10 through the shaft 12. On the out side of the holder plate 14, the shaft 12 is attached to one end of the return spring 17. A circular arc-shaped long hole 31 is formed in the upper part of the base plate 10. The pin 32 moves inside this hole, and when it strikes the ends of the hole 31a and 31b it limits the range of rotation of the arm plate 11. In addition, a rib 10a is formed on the outer perimeter of this base plate 10 in order to maintain the strength of the base plate. The other end of the said return spring 17 is attached to the tip 32a of the pin 32 which protrudes from the outside of the arm plate 11, and pushes the said arm plate 11 in the counterclockwise direction.

The upper plate 11a is fixed to the lower end of the said arm plate 11 by the pins 32, 33 and 34. This upper plate 11a is normally engaged to the lower pawl 18, and holds the said arm plate 11 at the reclining angle at which it is set. The pin 32 which fixes the said upper plate 11a to the arm plate 11 is formed in a stepped shape so that the return spring 17 is attached to its upper end. At the lower end of this pin 32 is a stopper section 32b which can move between the two ends 31a, 31b of the circular arc-shaped longhole 31 which is formed in the upper part of the said base plate 10.

The lower pawl 18 comprises a pair of tooth plates 35 and 36. They are connected to the same shaft between the said base plate 10 and the said holder plate 14 by the pin 19. The cam plates 37 and 38 are engaged to the depressions 35a and 36a formed in these tooth plates 35 and 36. In addition, the plurality of teeth on this pair of tooth plates 35 and 36, which have the same pitch, have their pitches mutually displaced by ½ tooth with respect to the pin 19. That is to say, before the teeth are cut in this pair of tooth plates 35 and 36, they are blanks of identical shape; when the teeth are cut, they are processed so that their pitches are mutually displaced by ½ tooth, and when they are attached to the pin 19 their pitches remain displaced by ½ tooth. The cam 20 comprises the said pair of cam plates 37 and 38, and are attached to and between the base plate 10 and the holder plate 14 through the lever shaft 21.

A pair of protrusions 37a and 38a are formed in this pair of cam plates 37 and 38 such that they engage with the depressions 35a and 36a in the tooth plates 35 and 36. They are biased in the counterclockwise direction by the springs 39 and 40, respectively. In addition, on the outside of the holder plate 14, the release lever 13 is attached to the holder plate 14 and the base plate 10 through the lever shaft 21. A lever pin 41 is imbedded in this release lever 13. It is located so that when the release lever 13 rotates upward, it slides into contact with the protrusions 37b and 38b on the cam plates 37 and 38. At the same time, in the central section a protrusion 13a which is bent toward the base plate 10 is formed. When the seat reclining device R is in an arbitrary adjusted position or is rotated downward toward the front, this protrusion 13a butts up against the peripheral rib 10a of the base plate 10 to hold the release lever 13 in its lowest position. Also, when the seat reclining device R is in an arbitrary adjusted position or is rotated down toward the front, the lever pin 41 which is imbedded in the release lever 13 is located so that it will not butt up against the protrusions 37b and 38b of the cam plate, so the release lever 13 is held at its lowest position by its own weight.

In the construction of an embodiment described above, the lower pawl 18 comprises a pair of tooth plates 35 and 36 which each have a plurality of teeth having the same pitch. Those teeth are cut so that their pitches are mutually displaced by ½ tooth, and both tooth plates are coaxially attached to the pin 19, so that the upper plate 11a and the lower pawl 18 are held securely engaged providing sufficient strength to withstand the force applied to the seat back B during, for example, a vehicle collision, and at the same time making fine adjustment of the reclining angle possible to add to the comfort of passengers riding in the car.

When the seat reclining device R is in an arbitrary adjusted position or is rotated down toward the front, the release lever 13 returns to the lowest position by its own weight, so the problem of the seat belt getting caught between the seat cushion A and the release lever 13 is eliminated, and, as a consequence, passenger safety is increased.

Figure 9:
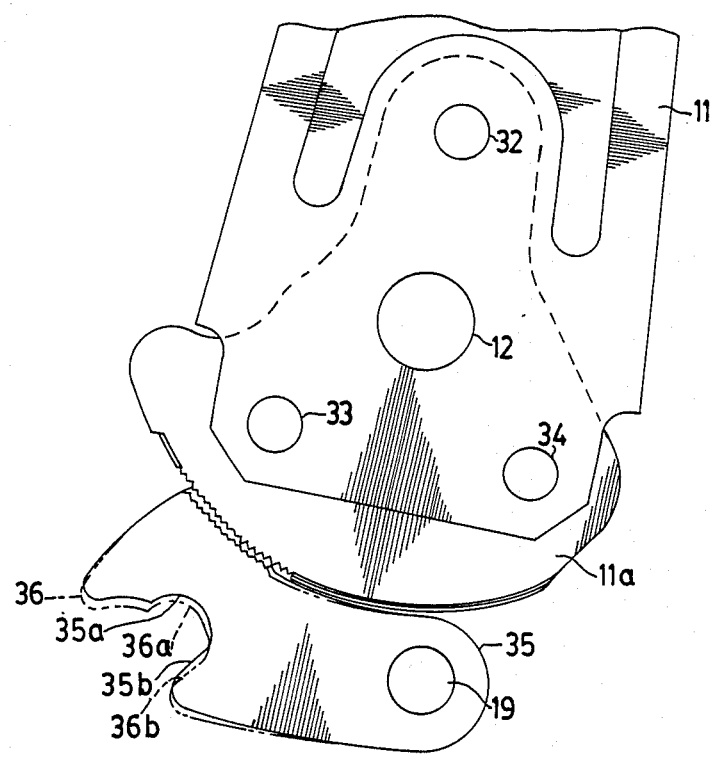
FIG. 9 shows an overall view of the same embodiment in the engaged condition.
Figure 10:
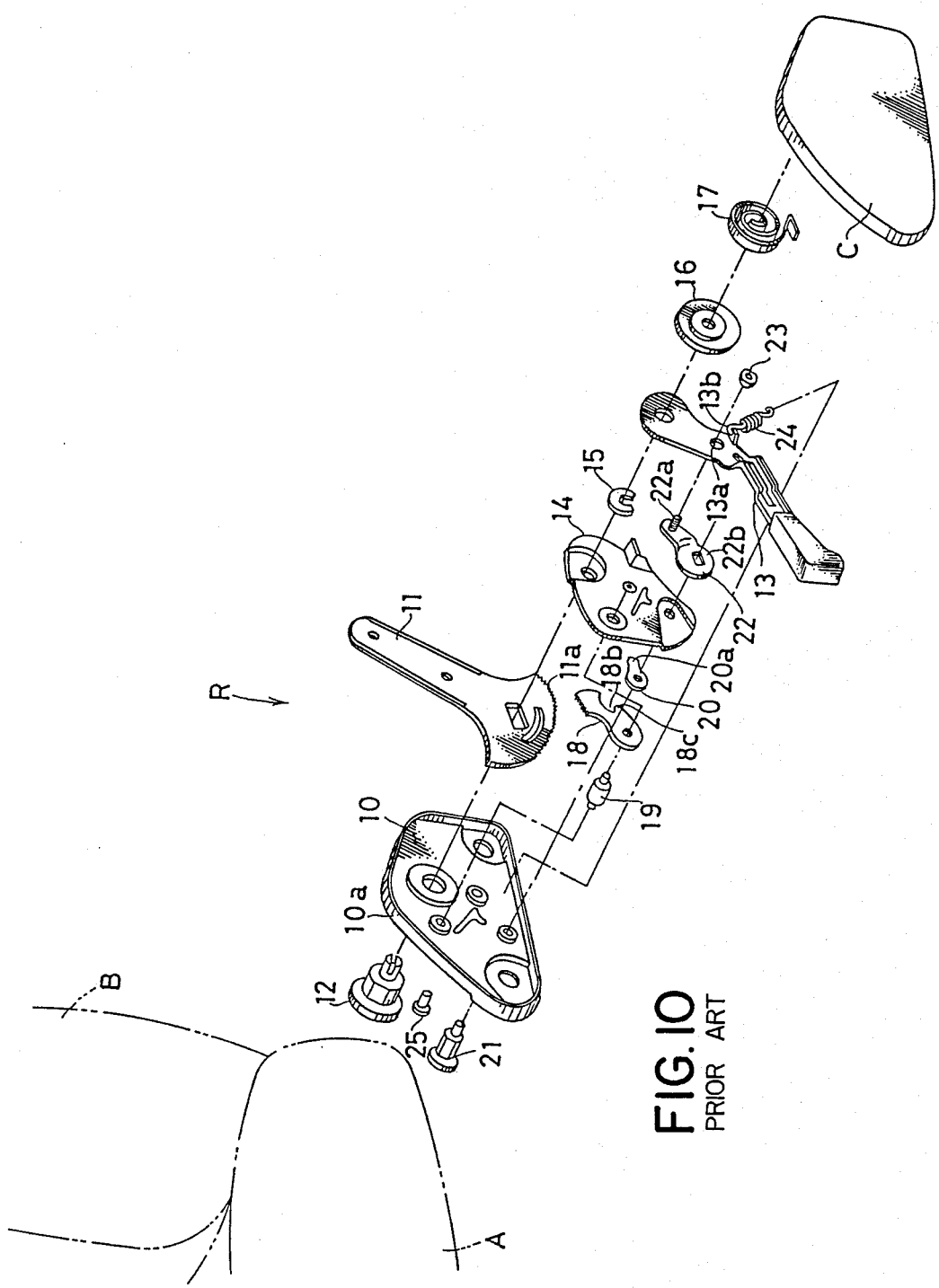
FIG. 10 shows an exploded diagonal view of a conventional prior art seat reclining device.

FIG. 7 to 9 show a seat reclining device R in which the upper plate 11a engages with the tooth plate 35 of one of the pawls 35 and 36 to hold the seat back B in an arbitrary reclining positions. To lower the seatback B from this position by the smallest possible additional angle, the release lever 13 is rotated upward to clockwise rotate the cam plate 37 through the pin 41 which is imbedded in the release lever. Then the protrusion 37a on the camplate 37 which is located inside the depression 35a in the tooth plate 35 pushes the side wall 35b of the coupling depression 35a formed in the tooth plate 35 downward. As a result, the tooth plate 35 rotates counterclockwise around the pin 19 as a center to release the upper plate 11a from the tooth plate 35, so that the seat back B can be adjusted to any desired reclining angle. Then the seat back B is rotated backward by the smallest possible adjustment angle, that is to say an amount corresponding to ½ tooth on the toothed sections of the upper plate 11a and the lower pawl 18, and the release lever 13 is released. When this is done, the tooth plate 36 is rotated counterclockwise by the cam plate 38 and engage the upper plate 11a, so that the seat reclining device R is locked in this position.

The above discussion describes how to increase the reclining angle by the smallest possible angle from a position in which the upper plate 11a is engaged to the tooth plate 35. To increase the reclining angle by a required amount from this position, first the release lower 13 is rotated upward as described above, to disengage the upper plate 11a from the tooth plate 35 so that the seat back B can be freely adjusted to any reclining angle. Next, when the seat back B is rotated to an arbitrary angle and the release lever 13 is released, then the tooth plates 35 and 36 will be biased in the direction of engaging with the upper plate 11a by the cam plates 37 and 38 which are pushed in the direction of counterclockwise rotation by the springs 39 and 40, respectively. One of the tooth plates 35 and 36 will engage to the upper plate 11a, locking the seat reclining device R in that position.

I claim:

1. A seat reclining device having a seat cushion and a seat back and comprising a base plate which is fixed to a side of the seat cushion; an arm plate which is rotatably attached to the said base plate and is also fixed to a side of the seat back; a pair of upper plates, each of which has meshing teeth extending over a certain area, which are fixed to the said arm plate so that they are parallel to each other; a pair of lower pawls each having meshing teeth which engage the meshing teeth of the said upper plates without interfering with each other, said lower pawls being coaxially and pivotally supported on the base plate; a pair of cam plates mounted on the base plate and associated with said lower pawls and in engagement therewith and which can be rotated so as to either hold the said lower pawls out of engagement with upper plates or to release them; and a release control section which is coupled to the said cam plates to control their action; characterized in that the pitches of the respective meshing teeth of the pawls or the upper plates are mutually displaced by ½ tooth.

2. A seat reclining device having a seat cushion and a seat back and comprising a base plate which is fixed to the seat cushion; an arm plate which is rotatably attached to the base plate and is also fixed to the seat back; an upper plate which is fixed to the lower end of the arm plate; a lower pawl which engages the upper plate to hold the seat back at a desired reclining angle; a cam mounted on the base plate which is coupled to the lower pawl; a release level for causing the said lower pawl to engage to and disengage from the said upper plate through the said cam; and a holder plate spaced from the base plate, the arm plate, the lower pawl and the cam being disposed between the holder plate and the base plate, the holder plate gripping the said arm plate, the said lower pawl and the said cam between itself and the said base plate; characterized in that the said lower pawl comprises a pair of tooth plates each of which has meshing teeth with the same pitch, which are coaxially provided such that their meshing tooth pitches are mutually displaced by ½ tooth.

* * * * *